US009358906B2

(12) United States Patent
Taylor et al.

(10) Patent No.: US 9,358,906 B2
(45) Date of Patent: Jun. 7, 2016

(54) SLOUCH REAR SEAT (71) Applicant: LEAR CORPORATION, Southfield, MI (US)

(72) Inventors: Alex Taylor, Coventry (GB); Rodger G. Smith, Haytons Bent Ludlow (GB); Adrian J. Lewis, Warwickshire (GB); Clive Pearce, Warwickshire (GB); Wayne Meyrick, Whitestone (GB)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/356,440

(22) PCT Filed: Mar. 1, 2013

(86) PCT No.: PCT/US2013/028542
§ 371 (c)(1),
(2) Date: May 6, 2014

(87) PCT Pub. No.: WO2013/142029
PCT Pub. Date: Sep. 26, 2013

(65) Prior Publication Data
US 2014/0327284 A1 Nov. 6, 2014

Related U.S. Application Data (60) Provisional application No. 61/685,486, filed on Mar. 19, 2012.

(51) Int. Cl.
*B60N 2/20* (2006.01)
*B60N 2/02* (2006.01)
(Continued)

(52) U.S. Cl.
CPC .............. *B60N 2/20* (2013.01); *B60N 2/0232* (2013.01); *B60N 2/045* (2013.01); *B60N 2/164* (2013.01);
(Continued)

(58) Field of Classification Search
CPC ...... B60N 2/20; B60N 2/1695; B60N 2/0232; B60N 2/164; B60N 2/2209; B60N 2/045; B60N 2/165; B60N 2/1615; B60N 2002/024
USPC ...................... 296/65.01, 65.05, 65.18, 65.16
See application file for complete search history.

(56) References Cited

U.S. PATENT DOCUMENTS 4,241,894 A * 12/1980 Okuyama ..................... 248/576
5,588,707 A * 12/1996 Bolsworth et al. ....... 297/378.12
(Continued)

FOREIGN PATENT DOCUMENTS

| CN | 1765652 A | 5/2006 |
|---|---|---|
| CN | 101224715 A | 7/2008 |
| CN | 101992703 A | 3/2011 |

OTHER PUBLICATIONS

International Search Report dated Apr. 10, 2013 in PCT/US2013/028542 filed Mar. 1, 2013, 2 pgs.
(Continued)

*Primary Examiner* — Jason S Morrow
*Assistant Examiner* — E Turner Hicks
(74) *Attorney, Agent, or Firm* — Brooks Kushman P.C.

(57) ABSTRACT

A slouch rear seat includes a seat bottom, a seat back pivotally mounted to the seat bottom, and a driver for moving the slouch rear seat between a design position and a fully forward position. Characteristically, the seat bottom moves from the design position to the fully forward position by the seat bottom moving upward and forward in a manner that avoids a vehicle occupant contacting the top of the vehicle cabin.

20 Claims, 7 Drawing Sheets (51) Int. Cl.
  *B60N 2/04* (2006.01)
  *B60N 2/16* (2006.01)
  *B60N 2/22* (2006.01)

(52) U.S. Cl.
  CPC .............. *B60N 2/165* (2013.01); *B60N 2/1615* (2013.01); *B60N 2/1695* (2013.01); *B60N 2/2209* (2013.01); *B60N 2002/024* (2013.01)

(56) References Cited

U.S. PATENT DOCUMENTS

| | | | |
|---|---|---|---|
| 6,361,109 B1* | 3/2002 | Tokarz et al. | 297/344.15 |
| 7,270,371 B2 | 9/2007 | Adragna et al. | |
| 7,367,571 B1 | 5/2008 | Nichols | |
| 7,374,245 B2* | 5/2008 | Tanaka et al. | 297/343 |
| 7,637,571 B2* | 12/2009 | Okano et al. | 297/343 |
| 8,579,368 B2 | 11/2013 | Kokubo et al. | |
| 2006/0131945 A1 | 6/2006 | Tanaka et al. | |
| 2007/0096497 A1* | 5/2007 | Adragna et al. | 296/65.16 |
| 2008/0164711 A1* | 7/2008 | Zambon et al. | 296/65.03 |
| 2008/0211283 A1 | 9/2008 | Okano et al. | |
| 2013/0049425 A1* | 2/2013 | Runde et al. | 297/354.12 |

OTHER PUBLICATIONS

CN Office Action dated Nov. 2, 2015 in Chinese Appn. No. 2013800092755 filed Aug. 13, 2014, 10 pgs.

* cited by examiner

SLOUCH REAR SEAT

CROSS-REFERENCE TO RELATED APPLICATIONS

This application claims the benefit of U.S. provisional Application No. 61/685,486, filed Mar. 19, 2012, the disclosure of which is incorporated in its entirety by reference herein.

FIELD OF THE INVENTION

In at least one aspect, the present invention relates to slouch rear seats for automotive applications.

BACKGROUND

Automotive rear seat and seat assemblies play an important role in automobile design and functionality and an ever-increasing role in customer satisfaction. One desired feature is that the seating be adjustable. Adjustability has been limited by the style of vehicle and the available rear seating clearance between the cargo area and forward seating area.

One type of rear seat is a slouch rear seat that moves between a design position and a forward position. Such seat designs are typically used in premium cars where cabin space is designed to allow for linear travel. Slouch seats are a type of seat typically used in the second row in a premium application. Such seats provide a passenger with the ability to sit in an upright position or in a semi-reclined position Therefore, any given slouch rear seat must be carefully designed to accommodate the spatial requirement of a given automobile design. In some prior art designs, the slouch seat includes a moving back frame and a fixed back frame. Relative movement between these two frames occurs during positioning of the slouch seat from the upright and semi-reclined position. In other designs, slouch seats are mounted on rails positioned on the passenger compartment floor. This designs work reasonably well except when the vehicle floor is not flat.

Accordingly, there is a need for improved slouch rear seat designs that are adaptable to vehicle compartments with a non-flat passenger cabin floor.

SUMMARY OF THE INVENTION

The present invention solves one or more problems of the prior art by providing a slouch rear seat for an automobile. The slouch rear seat includes a seat bottom, a seat back pivotally mounted to the seat bottom, and a driver for moving the slouch rear seat between a design position and a fully forward position. Characteristically, the seat bottom moves from the design position to the fully forward position by the seat bottom moving upward and forward in a manner that avoids a vehicle occupant contacting the top of the vehicle cabin and body in white.

In another embodiment, a slouch seat moveable between a design and fully forward position is provided. The slouch seat of this embodiment includes a rear bracket assembly, a forward bracket assembly, a first rear link pivotally attached to the rear bracket assembly, a second rear link pivotally attached to the rear bracket assembly, a first forward link attached to the forward bracket assembly, and a second forward link attached to the forward bracket assembly. The forward bracket assembly and the rear bracket assembly are mountable on one or more vehicle structural components. A seat bottom frame has a first side frame section, a second side frame section, and a forward frame section. The seat bottom is pivotally attached to the rear bracket assembly by the first rear link and the second rear link and to the forward bracket assembly by the first forward link and the second forward link. A seat back frame is pivotally mounted to the seat bottom frame. Finally, a driver motor is attached to at least one of the first rear link, the second rear link, the first forward link, and the second forward link. Characteristically, the driver motor moves the slouch seat from a design position to a fully forward position with an upward and forward motion.

In still another embodiment, a slouch seat moveable between a design and fully forward position is provided. The slouch seat of this embodiment includes a rear bracket assembly, a forward bracket assembly, a first rear link pivotally attached to the rear bracket assembly, a second rear link pivotally attached to the rear bracket assembly, a first forward link attached to the forward bracket assembly, and a second forward link attached to the forward bracket assembly. The forward bracket assembly and the rear bracket assembly are mountable on one or more vehicle structural components. A seat bottom frame has a first side frame section, a second side frame section, and a forward frame section. The seat bottom is pivotally attached to the rear bracket assembly by the first rear link and the second rear link and to the forward bracket assembly by the first forward link and the second forward link. A seat back frame is pivotally mounted to the seat bottom frame. Finally, a driver motor is mounted on the forward bracket assembly pivotally thereby driving the first forward link and/or the second forward link such that the first rear link and the second rear link pivot when the slouch seat moves between a design position and a fully forward position. Characteristically, the driver motor moves the slouch seat from the design position to the fully forward position with an upward and forward motion.

In yet another embodiment, a slouch seat moveable between a design and fully forward position is provided. The slouch seat of this embodiment includes a rear bracket assembly, a forward bracket assembly, a first rear link pivotally attached to the rear bracket assembly, a second rear link pivotally attached to the rear bracket assembly, a first forward link attached to the forward bracket assembly, and a second forward link attached to the forward bracket assembly. The forward bracket assembly and the rear bracket assembly are mountable on one or more vehicle structural components. A seat bottom frame has a first side frame section, a second side frame section, and a forward frame section. The seat bottom is pivotally attached to the rear bracket assembly by the first rear link and the second rear link and to the forward bracket assembly by the first forward link and the second forward link. A seat back frame is pivotally mounted to the seat bottom frame. Finally, a driver motor drives the first rear link and/or the second rear link such that the first forward link and the second forward link pivot when the slouch seat moves between a design position and a fully forward position. Characteristically, the driver motor moves the slouch seat from the design position to the fully forward position with an upward and forward motion.

Advantageously, the designs of the present embodiments are adaptable to non-flat vehicle compartment floors such as those that occur when accommodating the fuel tank in certain automotive vehicle designs.

BRIEF DESCRIPTION OF THE DRAWINGS

Exemplary embodiments of the present invention will become more fully understood from the detailed description and the accompanying drawings, wherein.

DESCRIPTION OF THE INVENTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1:
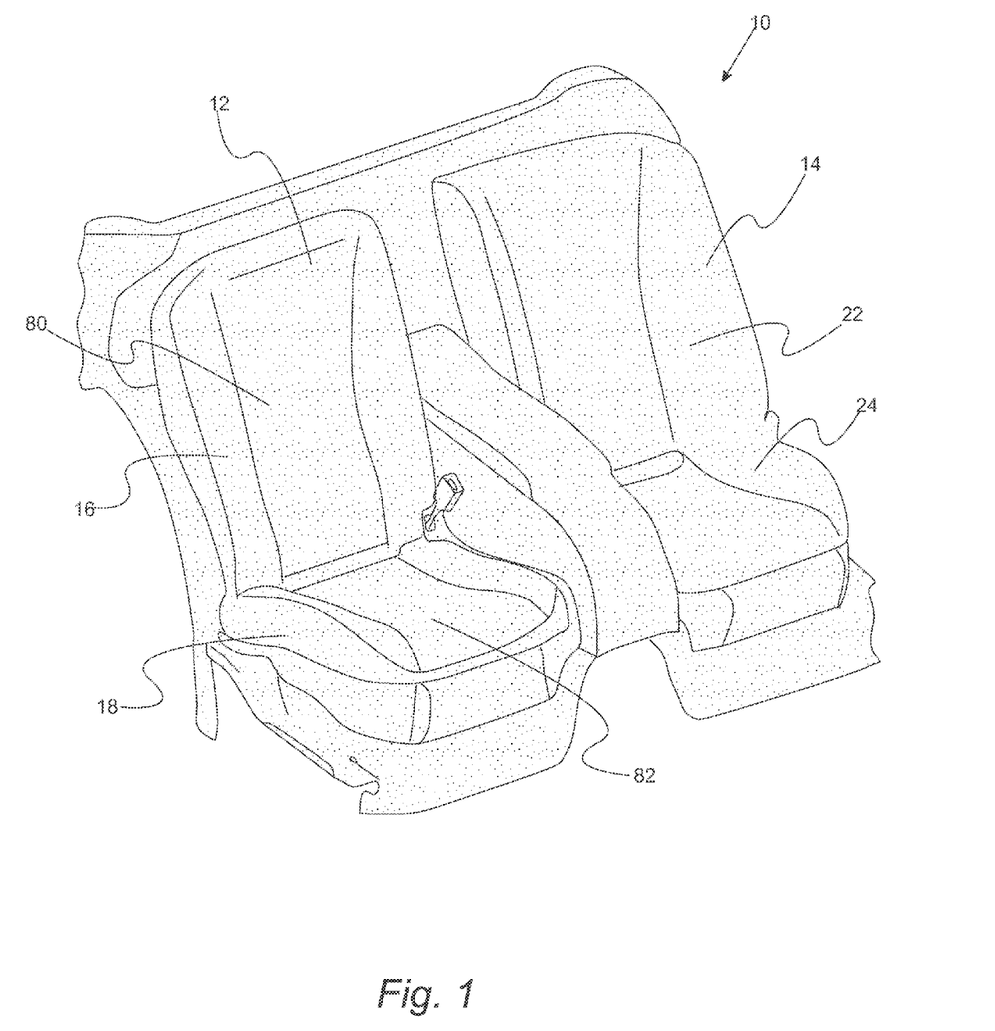
FIG. 1 is a perspective view of slouch rear seats incorporated into an automobile.
Figure 2:
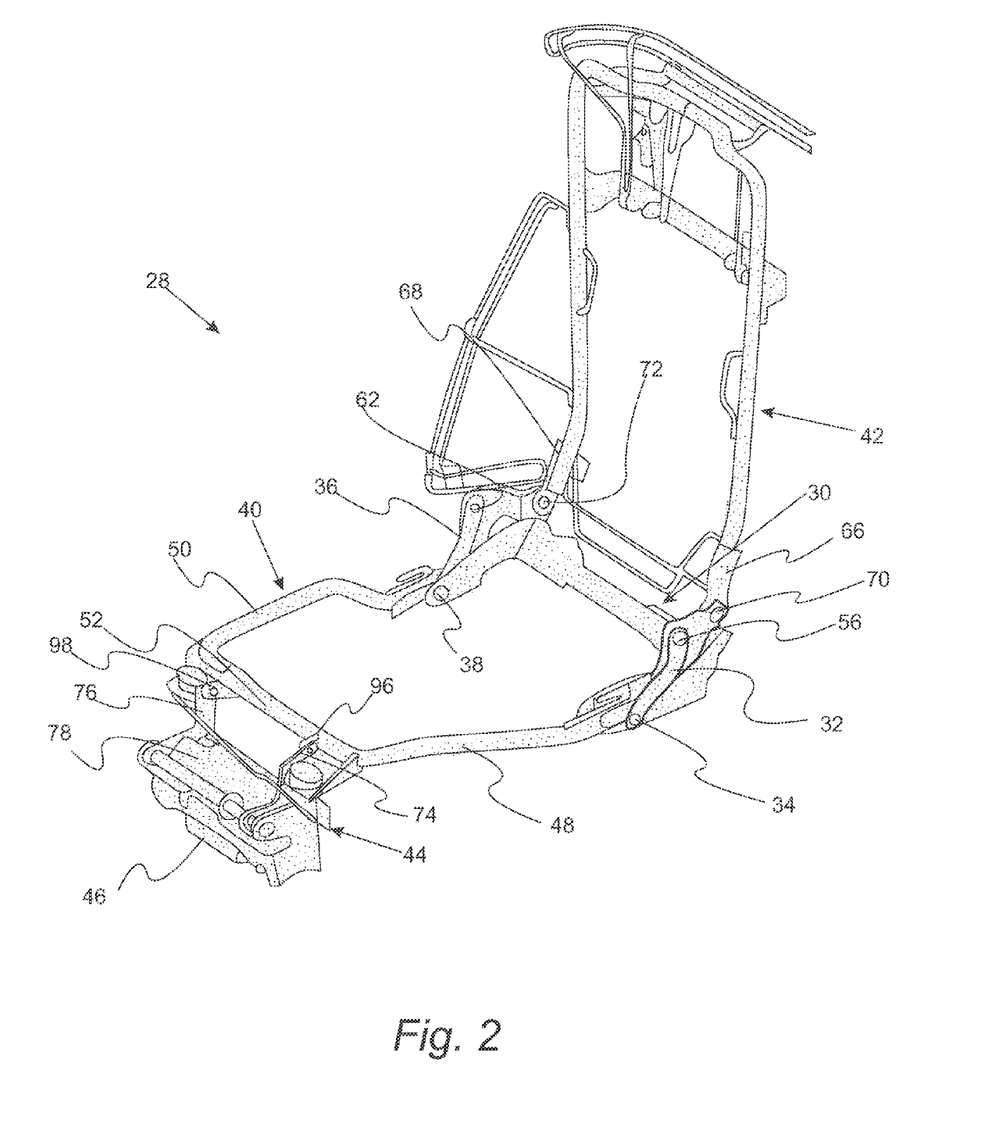
FIG. 2 is a perspective view of a slouch rear seat frame assembly.

With reference to FIGS. 1 and 2, schematic illustrations of a slouch seat, and in particular, a slouch seat to be placed at a rear position (i.e., slouch rear seat) in a vehicle cabin is provided. FIG. 1 provides a perspective view of slouch rear seats incorporated into an automobile. FIG. 2 is a perspective view of the slouch seat. Rear seating system 10 includes slouch rear seats 12 and 14. Slouch rear seat 12 includes seatback 16 and seat bottom 18 while slouch rear seat 14 includes seat back 22 and seat bottom 24. Each of slouch seats 12 and 14 includes a frame assembly.

For illustrative purposes, slouch seat 12 will be discussed in detail with the understanding that slouch seat 14 is of a similar construction. Slouch seat 12 includes frame assembly 28 which comprises rear bracket assembly 30, a first rear link 32 pivotally attached to the rear bracket assembly at pivot point 34, a second rear link 36 pivotally attached to the rear bracket assembly at pivot point 38, a seat bottom frame 40, a seat back frame 42, forward bracket assembly 44, and a driver motor 46. Seat bottom frame 40 includes a first side frame section 48, a second side frame section 50, and a forward frame section 52. Seat bottom frame 40 is pivotally attached to the rear bracket assembly 30 at pivot point 56 by the first rear link 32 on the first side frame section 48 and at a pivot point 62 by the second rear link 36 on the second side frame section 50. The seat back frame 42 is pivotally mounted to sear bottom frame 40 by bracing bracket 66 and 68 which pivot about pivot points 70 and 72.

Still referring to FIGS. 1 and 2, first forward link 74 is pivotally attached to forward frame section 52 while second forward link 76 is pivotally attached to forward frame section 52. Driver motor 46 is mounted on the forward bracket assembly 44. Driver motor 46 pivotally drives the first forward link 74 which causes movement of second forward link 76 via its attachment to forward frame section 52. Typically, seat back cushion 80 is disposed over seat back frame 42 and seat bottom cushion 82 is disposed over seat bottom frame 40. Characteristically, driver motor 46 moves the slouch seat 12 between a design position (e.g., fully rearward position) and a fully forward position. In particular, seat bottom 18 moves upward and forward when driven by driver motor 46 from the design to the fully forward position. This movement is described below in more detail.

Figure 3:
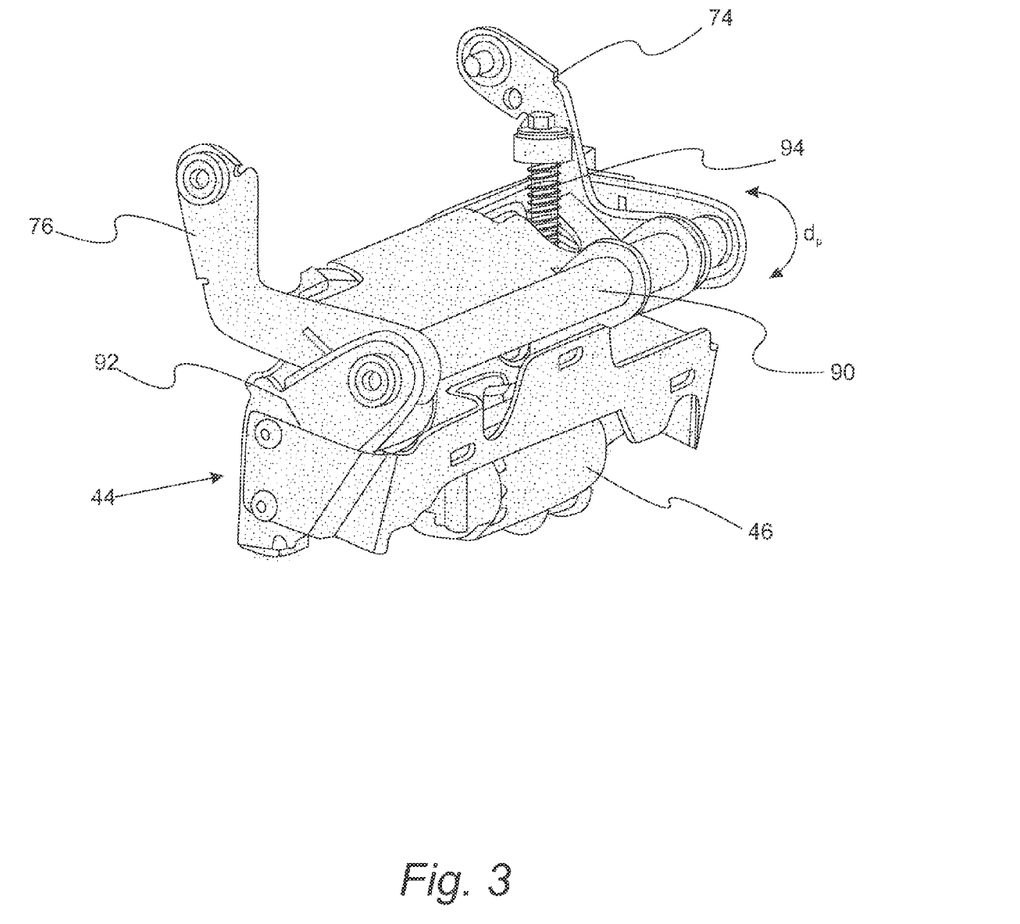
FIG. 3 is a perspective view of the motor driver mountable on the forward bracket assembly and a vehicle structural component.

With reference to FIGS. 2 and 3, schematic illustrations of the attachment of the forward bracket assembly to the driver motor and to the seat bottom frame are provided. FIG. 3 is a perspective view of the motor driver mounted on the forward bracket assembly. Motor driver 46 is mounted onto forward bracket assembly 44. Forward link 74 and second forward link 76 are fixed to rotatable cross member 90. Rotatable cross member 90 is securely held by, but rotatable with respect to, bracket 92 of forward bracket assembly 44. Motor driver 46 rotates threaded rod 94 which drives a gear (not shown) attached to first forward link 74 thereby causing pivoting of first forward link 74 and second forward link 76 along direction dp. First forward link 74 and second forward link 76 are pivotally attached to seat bottom frame 40 by attachment bracket 96, 98 which extend from forward frame section 52. In a refinement in which the seat back frame includes a fixed seat back frame component and a moveable seat back frame component, the moveable seat back frame component moves downward and angles when the seat moves from the design to the fully forward position as set forth below.

Figure 4:
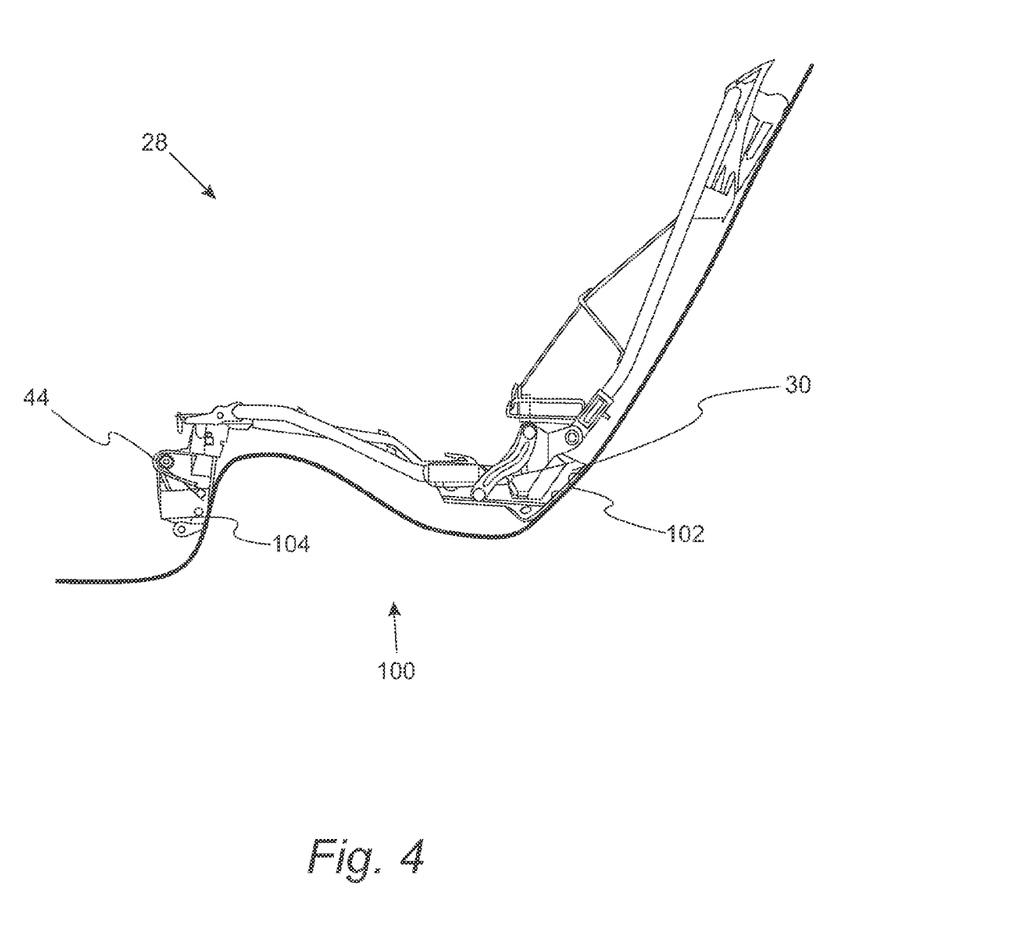
FIG. 4 is a perspective view showing the mounting of the seat assembly of FIGS. 1 and 2 to structural components in a vehicle.

With reference to FIG. 4, a perspective view of showing the mounting of the seat assembly of FIG. 2 to structural components in a vehicle is provided. Frame assembly 28 mounts to vehicle structural components 100 via rear bracket assembly 30 and forward bracket assembly 44. In particular, rear bracket assembly 30 is mounted at the front of bulkhead 102 and forward bracket assembly 44 is mounted to heelboard 104. An aspect of the present embodiment is the movement of the slouch rear seat from the design position to the fully forward position. In particular, the slouch rear seat is designed such that the seat bottom clears the ramp angle and package defined by the fuel tank. In this regard, it should be noted that the bottom of the vehicle depicted in FIG. 4 is not flat thereby making a seat mounted on straight tracks impractical. To this end, the seat bottom moves upward and forward when moving to the forward position.

Figure 5:
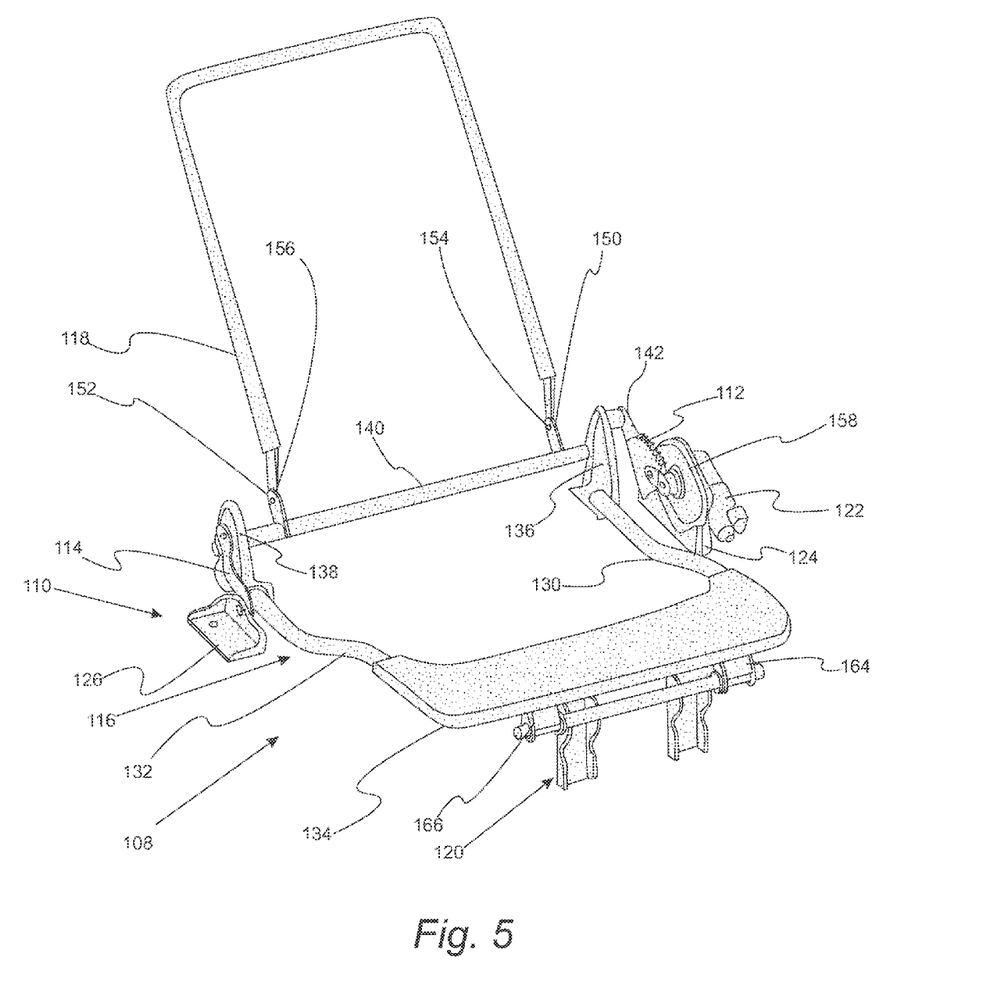
FIG. 5 provides a perspective view of a seat frame assembly for a slouch seat driven from the rear position.

With reference to FIGS. 1 and 5, schematic illustrations of a slouch seat being driven from the rear position are provided. FIG. 5 is a perspective view of a seat frame assembly for the slouch seat of this variation. The present variation moves from the design to the fully forward position in an analogous manner to the design of FIG. 2-4. In this variation, slouch seat 12 includes frame assembly 108 which comprises rear bracket assembly 110, a first rear link 112 pivotally attached to the rear bracket assembly, a second rear link 114 pivotally attached to the rear bracket assembly, a seat bottom frame 116, a seat back frame 118, forward bracket assembly 120, and a driver motor 122. Rear bracket assembly 110 includes brackets 124, 126. Seat bottom frame 116 includes a first side frame section 130, a second side frame section 132, a forward frame section 134, brackets 136 and 138, and cross member 140. Brackets 136 and 138 are fixed to cross member 140. Seat bottom frame 116 is fixed on first side frame section 130 to the rear bracket 136 which is pivotally attached to first rear link 112. Similarly, seat bottom frame 116 is fixed on second side frame section 132 to the rear bracket 138 which is pivotally attached to second rear link 114. Therefore, seat bottom frame 116 is pivotable with respect to rear bracket assembly 110. Seat back frame 118 is pivotally mounted to the seat bottom frame 116 by brackets 150 and 152 which pivot about pivot points 154 and 156.

Still referring to FIGS. 1 and 5, first forward link 164 and second forward link 166 are pivotally attached to forward frame section 134 and to forward bracket assembly 120. Driver motor 122 is mounted on bracket 124. Driver motor 122 rotates first rear link 112 about pivot point 160 which thereby causes movement of seat bottom frame 116. As set forth above, seat back cushion 80 is disposed over seat back frame 118 and seat bottom cushion 82 is disposed over seat bottom frame 116. Characteristically, driver motor 122 moves the slouch seat 12 between a design position and a fully forward position. In particular, seat bottom frame 118 moves upward and forward when driven by driver motor 122 from the design to the fully forward position. This movement is described below in more detail.

Figure 6A:
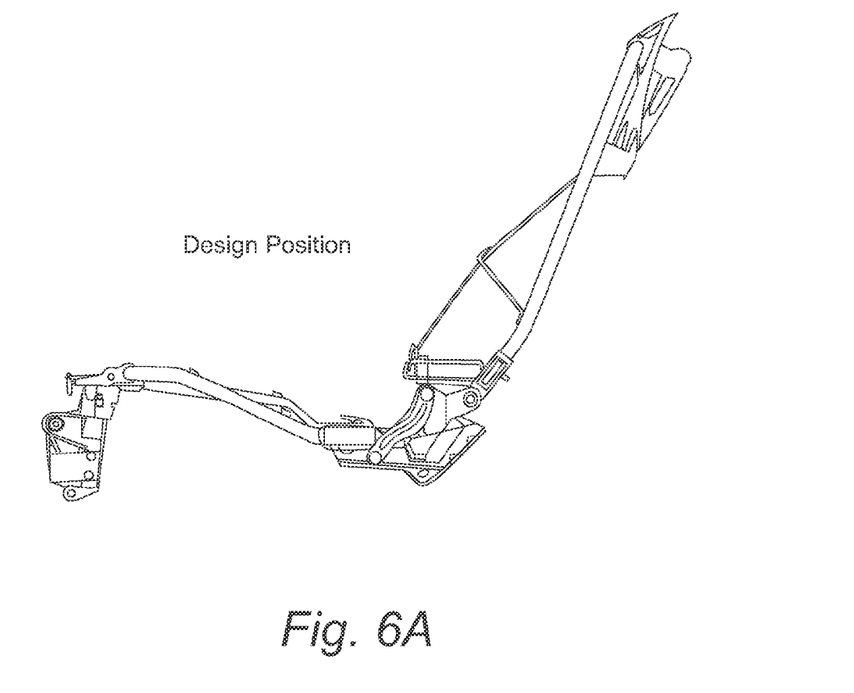
FIGS. 6A and 6B provide side views showing a slouch rear seat in the design and fully forward position respectively.
Figure 6B:
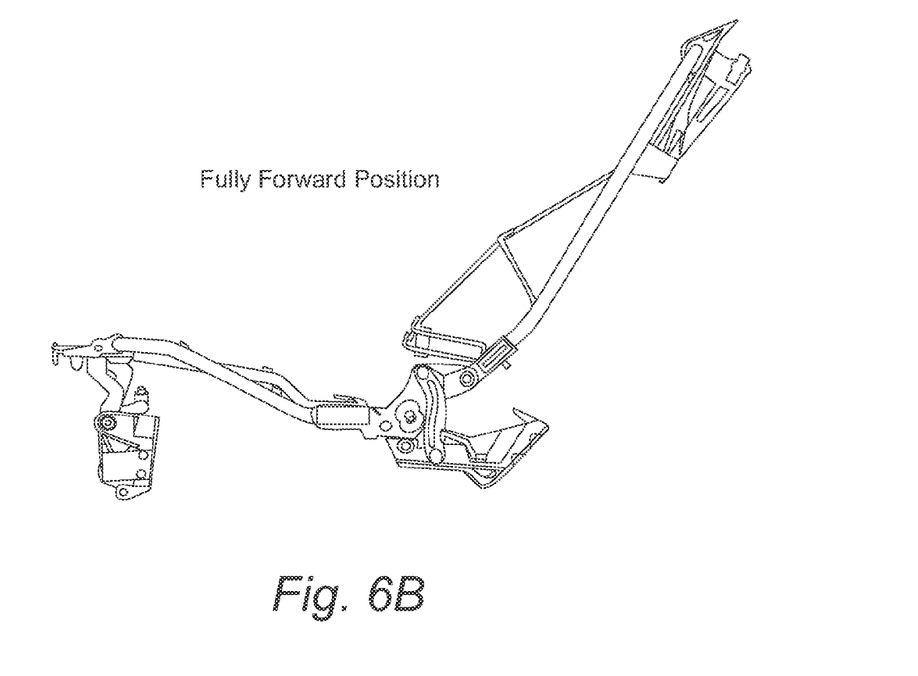

With reference to FIGS. 6A and 6B, a schematic side view of the slouch seat of FIGS. 1-4 in the design and fully forward position are provided. FIG. 6A illustrates slouch rear seat 12 in the design position while FIG. 6B illustrates slouch rear seat 12 in the fully forward position.

Figure 7:
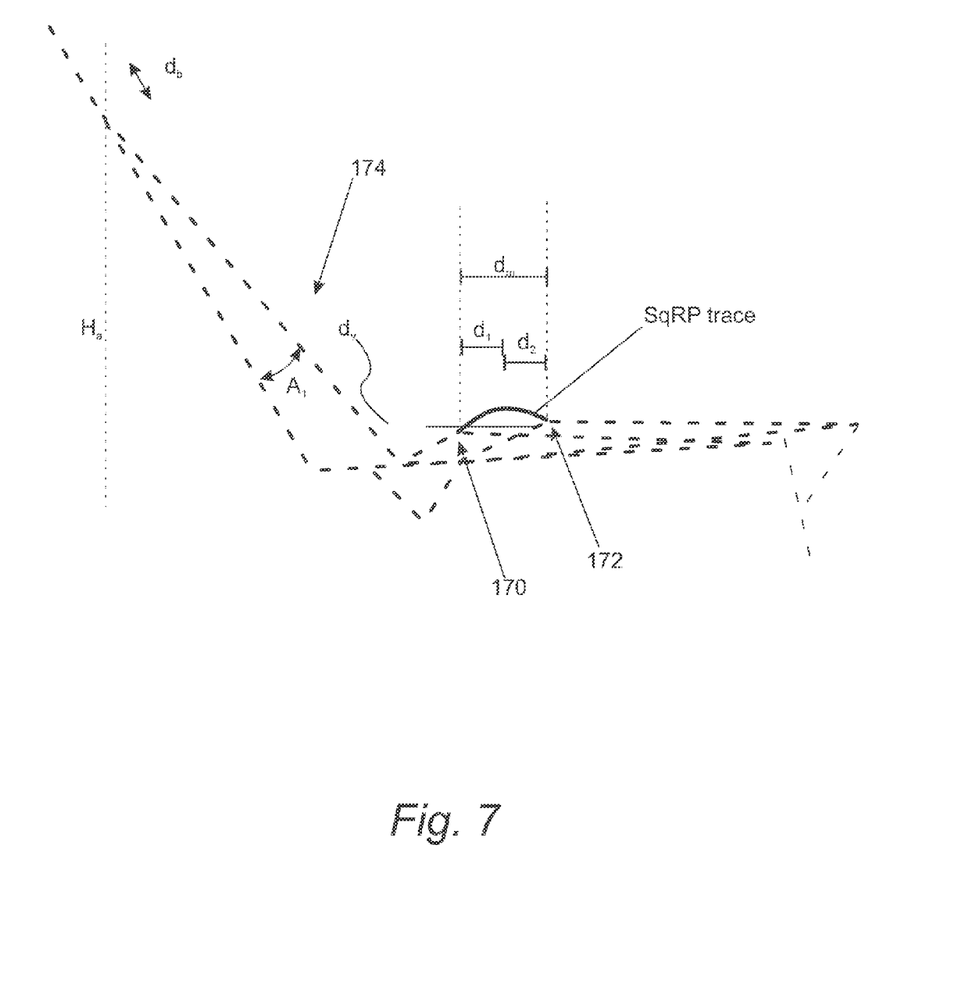
FIG. 7 provides a plot illustrating the upward and forward movement of the seat bottom while the slouch rear seat is moved from the design to the fully forward position.

FIG. 7 provides a plot of the SgRP trace illustrating this point. The SgRP trace plots the movement of a test occupant's hip (e.g. passenger dummy) point from the SgRP design position 170 to the fully forward position 172. It should be appreciated that the motion of the seat must be such that contact of a vehicle occupant with the cabin roof is avoided. Therefore, maximum vertical movement dv is typically from about 4 to 8 inches. The seat bottom frame (or position of test occupant's hips) moves a maximum distance forward dm. The seat bottom frame moves upward and forward for a first distance d1 and then forward and optionally downward for a second distance d2. The seat frame moves a maximum distance forward dm which is typically from 6 to 18 inches. In this regard, the directions are oriented with respect to an automotive vehicle. Therefore, upward (i.e., vertical) is away from a vehicle bottom or floor and forward being away from the rear trunk or bumper. FIG. 7 also depicts the concurrent movement of the seat back frame by item number 174. The seat back frame moves downwardly along diagonal direction db with the seat back being oriented at a first angle relative to a horizontal axis at the design position and at a second angle at the fully forward position. In a refinement, the difference between the first and the second angle (i.e., the second angle minus the first angle) is from about 5 degrees to about 15 degrees. In a further refinement, the difference A1 between the first and the second angle is about 10 degrees.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A slouch seat comprising:
a rear bracket assembly;
a forward bracket assembly, the forward bracket assembly and the rear bracket assembly mountable on one or more vehicle structural components;
a first rear link pivotally attached to the rear bracket assembly;
a second rear link pivotally attached to the rear bracket assembly;
a first forward link attached to the forward bracket assembly;
a second forward link attached to the forward bracket assembly;
a seat bottom frame having a first side frame section, a second side frame section, and a forward frame section, the seat bottom frame pivotally attached to the rear bracket assembly by the first rear link and the second rear link and to the forward bracket assembly by the first forward link and the second forward link;
a seat back frame pivotally mounted to the seat bottom frame; and
a driver motor attached to at least one of the first rear link, the second rear link, the first forward link, and the second forward link, the driver motor moving the slouch seat from a design position to a fully forward position with an upward and forward motion for a first distance and then downward for a second distance.

2. The slouch seat of claim 1 wherein the driver motor is mounted on the forward bracket assembly pivotally driving the first forward link and/or the second forward link.

3. The slouch seat of claim 1 wherein the driver motor pivotally drives the first rear link or the second rear link.

4. The slouch seat of claim 1 wherein the seat bottom frame is driven forwardly and upwardly for a first distance and then downwardly for a second distance.

5. The slouch seat of claim 1 wherein the driver motor rotates the first forward link or the second forward link thereby causing pivoting of the first rear link and the second rear link.

6. The slouch seat of claim 1 wherein the driver motor rotates the first rear link or the second rear link thereby causing pivoting of the first forward link and the second forward link.

7. The slouch seat of claim 1 wherein the first rear link is pivotally attached to the first side frame section and the second rear link is pivotally attached to the second side frame section.

8. The slouch seat of claim 1 wherein the seat back frame is pivotally mounted to the seat bottom frame by two brackets.

9. The slouch seat of claim 1 wherein the seat back frame is positioned at a first angle relative to a horizontal axis at the design position and at a second angle at the fully forward position.

10. The slouch seat of claim 9 wherein the second angle minus the first angle is from about 5 degrees to about 15 degrees.

11. The slouch seat of claim 1 wherein the first rear link, the second rear link, the first forward link and the second forward link are each independently a metal plate.

12. The slouch seat of claim 11 wherein the first rear link and the second rear link, the first forward link and the second forward link are each independently a curved metal plate.

13. The slouch seat of claim 1 further including a seat back cushion disposed over the seat back frame and a seat bottom cushion disposed over the seat bottom frame.

14. The slouch seat of claim 1 wherein the rear bracket assembly is attachable to a vehicle bulkhead.

15. A slouch seat comprising:
a rear bracket assembly;
a forward bracket assembly, the forward bracket assembly and the rear bracket assembly mountable on one or more vehicle structural components;
a first rear link pivotally attached to the rear bracket assembly;
a second rear link pivotally attached to the rear bracket assembly;
a first forward link attached to the forward bracket assembly;
a second forward link attached to the forward bracket assembly;

a seat bottom frame having a first side frame section, a second side frame section, and a forward frame section, the seat bottom frame pivotally attached to the rear bracket assembly by the first rear link and the second rear link and to the forward bracket assembly by the first forward link and the second forward link;

a seat back frame pivotally mounted to the seat bottom frame; and a driver motor mounted on the forward bracket assembly pivotally driving the first forward link and/or the second forward link such that the first rear link and the second rear link pivot when the slouch seat moves between a design position and a fully forward position, the driver motor moving the slouch seat from the design position to the fully forward position with an upward and forward motion for a first distance and then downward for a second distance.

16. The slouch seat of claim 15 wherein the first rear link is pivotally attached to the first side frame section and the second rear link is pivotally attached to the second side frame section.

17. The slouch seat of claim 15 wherein the seat back frame is positioned more upright when the seat bottom frame is at the design position than when at fully forward position.

18. The slouch seat of claim 15 further including a seat back cushion disposed over the seat back frame and a seat bottom cushion disposed over the seat bottom frame.

19. The slouch seat of claim 15 wherein the rear bracket assembly is attachable to a vehicle bulkhead.

20. A slouch seat comprising:

a rear bracket assembly;

a forward bracket assembly, the forward bracket assembly and the rear bracket assembly mountable on one or more vehicle structural components;

a first rear link pivotally attached to the rear bracket assembly;

a second rear link pivotally attached to the rear bracket assembly;

a first forward link attached to the forward bracket assembly;

a second forward link attached to the forward bracket assembly;

a seat bottom frame having a first side frame section, a second side frame section, and a forward frame section, the seat bottom frame pivotally attached to the rear bracket assembly by the first rear link and the second rear link and to the forward bracket assembly by the first forward link and the second forward link;

a seat back frame pivotally mounted to the seat bottom frame; and a driver motor driving the first rear link and/or the second rear link such that the first forward link and the second forward link pivot when the slouch seat moves between a design position and a fully forward position, the driver motor moving the slouch seat from the design position to the fully forward position with an upward and forward motion for a first distance and then downward for a second distance.

* * * * *